(12) United States Patent
Di Donato

(10) Patent No.: US 10,923,000 B2
(45) Date of Patent: Feb. 16, 2021

(54) SIMULATOR FOR TRAINING IN ENVIRONMENTS CONFINED AND / OR SUSPECTED OF POLLUTION

(71) Applicant: ISTITUTO NAZIONALE PER L'ASSICURAZIONE CONTRO GLI INFORTUNI SUL LAVORO-INAIL, Rome (IT)

(72) Inventor: Luciano Di Donato, Cecchina (IT)

(73) Assignee: ISTITUTO NAZIONALE PER L'ASSICURAZIONE CONTRO GLI INFORTUNI SUL LAVORO—INAIL, Rome (IT)

(*) Notice: Subject to any disclaimer, the term of this patent is extended or adjusted under 35 U.S.C. 154(b) by 310 days.

(21) Appl. No.: 15/923,387

(22) Filed: Mar. 16, 2018

(65) Prior Publication Data
US 2018/0286288 A1 Oct. 4, 2018

(30) Foreign Application Priority Data
Mar. 31, 2017 (IT) .................. 102017000035950

(51) Int. Cl.
*G09B 25/02* (2006.01)
*G09B 9/00* (2006.01)
(Continued)

(52) U.S. Cl.
CPC .............. *G09B 25/02* (2013.01); *A63J 5/025* (2013.01); *E04B 1/343* (2013.01);
(Continued)

(58) Field of Classification Search
CPC .......... G09B 25/02; G09B 9/00; G09B 25/04; E04H 1/1205; E04H 2001/1283;
(Continued)

(56) References Cited

U.S. PATENT DOCUMENTS

| 5,143,478 A * | 9/1992 | Bowman ............... E02D 29/124 |
| | | 404/26 |
| 5,752,835 A * | 5/1998 | Whitmer, Sr. ........... G09B 9/00 |
| | | 434/226 |
| 6,799,975 B1 | 10/2004 | Dunn |
| 7,008,230 B2 | 3/2006 | Hoglund |
| 7,244,123 B1 | 7/2007 | Barron |
| 7,901,212 B2 | 3/2011 | Quinn et al. |
| 2003/0198923 A1 | 10/2003 | Westra |

(Continued)

FOREIGN PATENT DOCUMENTS

| CN | 203616899 U | 5/2014 |
| FR | 2 870 974 A | 12/2005 |

(Continued)

*Primary Examiner* — Robert P Bullington
*Assistant Examiner* — Stephen Alvesteffer
(74) *Attorney, Agent, or Firm* — Nixon & Vanderhye

(57) ABSTRACT

Disclosed is a simulator for training in environments confined and/or suspected pollution consists of a container having a base, a roof opposite the base, and short perimeter walls and long with at least one vertical manhole, a horizontal manhole and two safety exits to the outside. The two long perimeter walls delimit a plurality of internal compartments for the exercise of the personnel with equipment that create effects for the training activity, and at least one training activity control, command and management cabin with operator present. The internal compartments for the personnel training are at least partially separated by way of movable walls disposed transversely to the two long perimetral walls. The movable walls have adjustable passage openings through sliding partitions.

16 Claims, 6 Drawing Sheets

(51) Int. Cl.
    *A63J 5/02*          (2006.01)
    *E04B 1/343*        (2006.01)
    *E06B 5/00*         (2006.01)
    *E04H 1/12*         (2006.01)

(52) U.S. Cl.
    CPC ....... *E04B 1/34336* (2013.01); *E04H 1/1205* (2013.01); *G09B 9/00* (2013.01); *E04H 2001/1283* (2013.01); *E06B 5/00* (2013.01)

(58) Field of Classification Search
    CPC ...... E04B 1/34336; E04B 1/343; A63J 5/025; E06B 5/00
    USPC .......................................................... 434/219
    See application file for complete search history.

(56) References Cited

U.S. PATENT DOCUMENTS

| | | | | |
|---|---|---|---|---|
| 2005/0233289 | A1* | 10/2005 | Hoglund | G09B 19/00 |
| | | | | 434/226 |
| 2009/0188188 | A1 | 7/2009 | Rivet | |
| 2011/0256515 | A1* | 10/2011 | Miller | G09B 25/00 |
| | | | | 434/219 |
| 2012/0144762 | A1* | 6/2012 | Eatock | G09B 19/00 |
| | | | | 52/79.5 |
| 2019/0118016 | A1* | 4/2019 | Severijns | A62C 99/0081 |

FOREIGN PATENT DOCUMENTS

| | | |
|---|---|---|
| FR | 2 877 126 A1 | 4/2006 |
| GB | 2 463 092 A | 3/2010 |
| WO | 2014/177880 A2 | 11/2014 |

* cited by examiner

SIMULATOR FOR TRAINING IN ENVIRONMENTS CONFINED AND / OR SUSPECTED OF POLLUTION

FIELD OF THE INVENTION

The present invention relates to a simulator for training in environments confined and/or suspected of pollution.

The simulator is destined to carry out an informative, formative and training course that is able to deal with the main risks deriving from activities in environments confined and/or suspected of pollution, and therefore allows company personnel and also employers themselves, if engaged in the activity, to comply, among other things, with the dictates of Presidential Decree 177/2011 of the Italian Republic for the qualification of companies operating in such environments. The simulator, as described below, allows to reproduce critical situations, such as falls from a height, polluted environment, microclimate, noise, optical effects, disorientation, fatigue, which could occur in such environments as well as to study new techniques for the recovery of non-collaborating subjects through vertical and horizontal openings with variable geometry. The simulator is transportable.

PRIOR ART

U.S. Pat. No. 7,008,230 B2 describes a mobile fire-fighting simulator comprising a semi-trailer having a substantially closed rectangular-shaped body and including a plurality of partitions for dividing the body into several rooms: a first room located at one end of the semitrailer, used as warehouse when the simulator is not in use, and for training when it is in use; a second room, close to the first one, which simulates a kitchen and contains a first gas burner to provide the flames during the training; a third room located at the second end of the semi-trailer having at least one other gas burner used for training in a hot environment; and an operator control room with windows through which the training process can be monitored and the delivery of natural gas to said burners can be controlled.

FR 2 877 126 A1 describes a multi-room fire-fighting training simulator with an unprotected observation zone because it is in direct contact with a fire chamber.

U.S. Pat. No. 7,901,212 B2 highlights the need to improve recovery training in collapsed buildings in view of terrorist attacks such as the September 11 tragedy, as well as in cases of earthquakes and other natural disasters. The collapsed buildings present particular dangers for first rescuers, such as limited or no visibility, unstable floors, gas leaks, dense smoke and uncovered electric cables. The document cited highlights that the current training units do not realistically reproduce the dangerous and strongly confined conditions of a collapsed building. Unsuitably trained rescue personnel risk causing serious harm to themselves, trapped victims and other rescuers.

U.S. Pat. No. 7,901,212 B2 proposes an easily transportable simulator with a plurality of partitions and obstacles that include baffles hinged to the ceiling and benches mounted on fulcrums pivoted on the floor, so as to give the training personnel experience of structural failures of the environment in which they are located.

CN203616899 discloses a mobile training unit divided into three spaces such as a high operational safety cabin, a storage area for auxiliary equipment, a simulated operating area. There are an open manhole, a similar operating area with surveillance cameras, toxic gas detectors, vacuum pumps, air compressors, toxic gas tanks, leakage valves, gas meters, and other devices for creating special effects. The surveillance cameras include so-called PTZ cameras (pan-tilt-zoom cameras), capable of orienting themselves and zooming into the environment, and infrared cameras.

WO2014/177880 A2 describes a mobile training unit which includes a transportable container with an internal training area and a plurality of training panels which can be selected and placed in a desired position and orientation within the area of training.

FR 2 870 974 describes a mobile fire-fighting training assembly comprising a box whose first longitudinal section is arranged like a theoretical training room and a second longitudinal section is provided with means for accessing a platform located on the roof of the box to act as a hall of evacuation exercises.

U.S. Pat. No. 7,244,123 B1 discloses a self-supporting training device for simulated entry, exit and recovery of personnel in a confined space. A tank is placed on a car trailer and has an upper entrance and a side entrance for entry and exit. Above the tank is a walkway protected by a railing.

US 2003/0198923 A1 describes a fire-fighting training building having a movable and removable partitioning system for changing the presentation of the building's interior plan. The building includes a plurality of tracks arranged above the movable walls and a plurality of movable and removable wall panels slidably mounted on the tracks.

GB 2463092 describes a mobile training unit comprising a transportable container having a work compartment confined with a movable wall portion between a closed transport position and an open training position.

U.S. Pat. No. 6,799,975 B1 describes a mobile simulation unit for recovery training in confined spaces having a simple modular structure that can be arranged in a variety of different scenarios. The unit is mounted on a trailer to make it transportable and has an elongated top working area and two inter-connecting modular indoor sections.

US 2009/188188 A1 provides a device and a method for simulating a building environment for personnel training. The device comprises a plurality of wall panels that can be joined together and simulate a building plan. The wall panels are preferably prefabricated modular devices adapted to be assembled and disassembled for different plan configurations.

All the aforementioned documents provide a simulator structure, with walls, manholes and doors, which remains constant or may be modified by the same personnel in training, as, for example, described in U.S. Pat. No. 7,901, 212 B2. These documents do not address the problem of who should enter the confined space having knowledge of it as a standardized environment, for example that of tanks built in series, or on the basis of planimetric information received just before access. Rather, it often happens that rescuers enter the confined space and must face risks and dangers arising from a different structure than expected.

SUMMARY OF THE INVENTION

An object of the present invention is to form, inform and train rescue personnel allowing them to face critical situations in conditions of safety in an unexpected confined environment, as not corresponding to what they know on the base of their experience or of information received before the access.

A further object of the invention is to vary the passageway for personnel in training and for the recovery of non-cooperating rescuers.

Another object of the present invention is to modify the critical situations presented to the personnel being trained by an operator in a control room and responsible for the control, command and management of the activities.

Yet another object of the invention is that of forming emergency personnel in an emergency simulator on the Lock Out Tag Out procedure, that is to say the restart block, which requires a reliable deactivation of dangerous energy sources of the machines during maintenance or service operations.

The aforementioned purposes are achieved by a simulator for training in environments confined and/or suspected of pollution, being constituted by a container that has a base, a roof opposite to the base, and short and long perimeter walls with at least one vertical manhole, a horizontal manhole, and two safety outputs outwards, the two long perimeter walls delimiting a plurality of internal compartments for personnel training, the internal compartments being provided with equipment that produces effects in training activities, and at least one training activity control, command and management cabin with operator, wherein the internal compartments for personnel training are at least partially separated by means of movable partitions arranged transversely to the two long perimeter walls.

Advantageously, the movable partitions have adjustable passage openings through sliding baffles.

In particular, the movable partitions can slide on rails and allow to alter the initial layout of the simulator creating unexpected obstacles. The adjustable passage openings impose forced passages on personnel passing through the simulator, crawling on the walking surface or climbing over the part of the wall that is faced.

The simulator according to the invention is made in a normal container inside which an interactive system is created which reproduces, in a protected form, a working environment with the main critical situations that can be presented to workers operating in environments confined and/or suspected of pollution. These situations, which imply maintenance, regulation, inspection, welding, use of penetrating liquids in electrical, hydraulic, mechanical works and other activities, in daily reality sometimes cause serious and often lethal injuries.

The activities to be reproduced serve to train the personnel operating in environments such as cesspools, sewers, chimneys, pits, tunnels and in general in environments and containers, conduits, boilers and the like, with the presence of dangerous gases, if any. Personnel must be trained to cope with dangers arising from the presence of toxic, asphyxiating, flammable or explosive gases or vapors, which in reality are due to the geological nature of the terrain or the presence of factories, warehouses, refineries, compression and decompression stations, methane pipelines and gas pipelines, which can give rise to infiltration of dangerous substances. Other potentially dangerous environments are those of pools, channels, pipes, tanks, containers, silos. The simulator makes it possible to evaluate the risks due to falls from above common in almost all the aforementioned environments. The training carried out by simulating the above environments, allows to meet the requirements of Presidential Decree 177/2011 of Italian Republic, "Qualification of companies operating in the field of environments confined and/or suspected of pollution", but is a valid simulator for similar realities in other Countries.

BRIEF DESCRIPTION OF THE DRAWINGS

Further characteristics and advantages of the present invention will become most clear from the indicative, and therefore non-limiting, description of a preferred but not exclusive embodiment of a simulator for training in environments confined and/or suspected of pollution, as illustrated in the accompanying drawings in which.

DETAILED DESCRIPTION OF THE INVENTION

Figure 1:
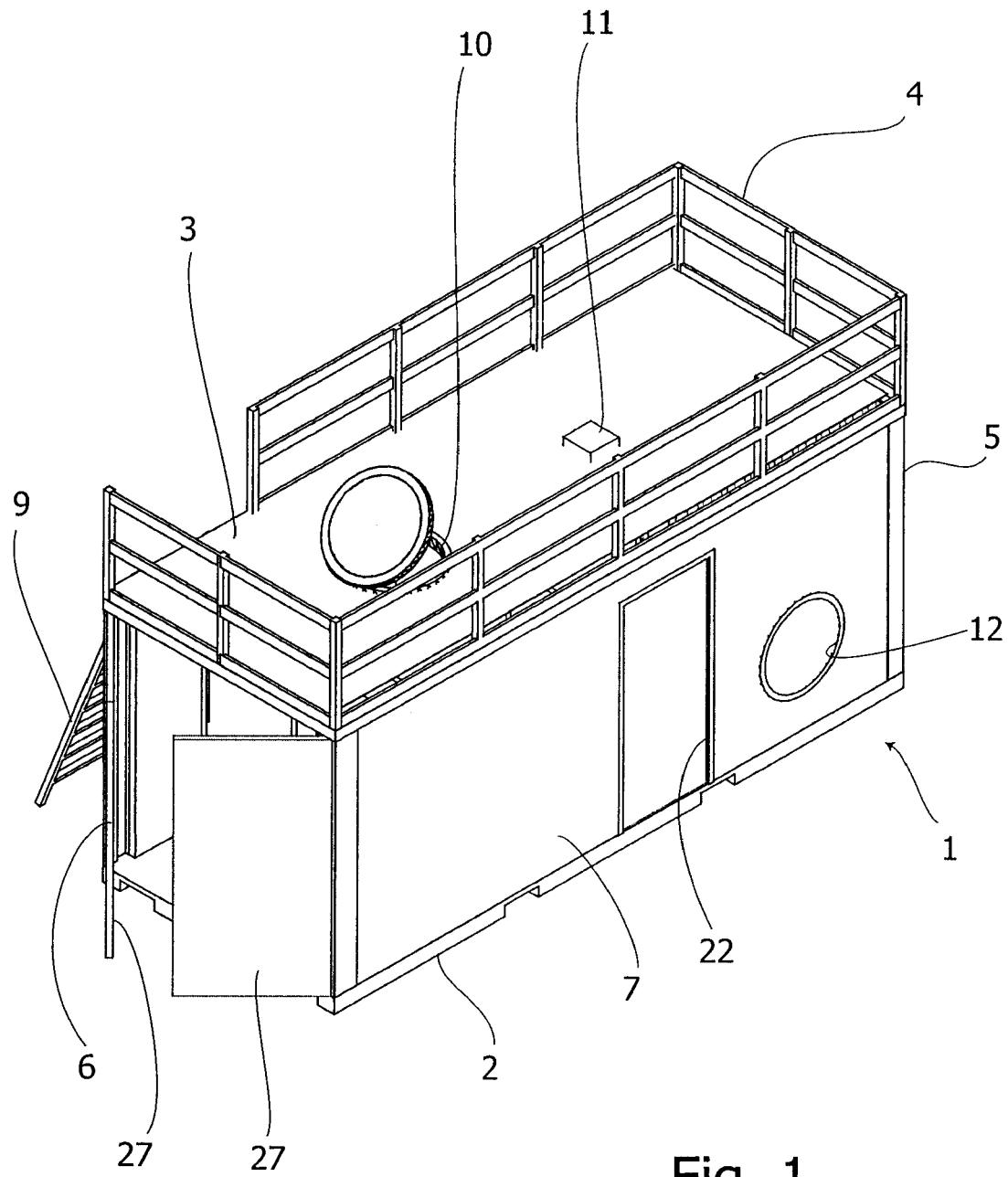
FIG. 1 is a three-quarter schematic axonometric view from above of the simulator according to the present invention, with protection fence being raised.
Figure 2:
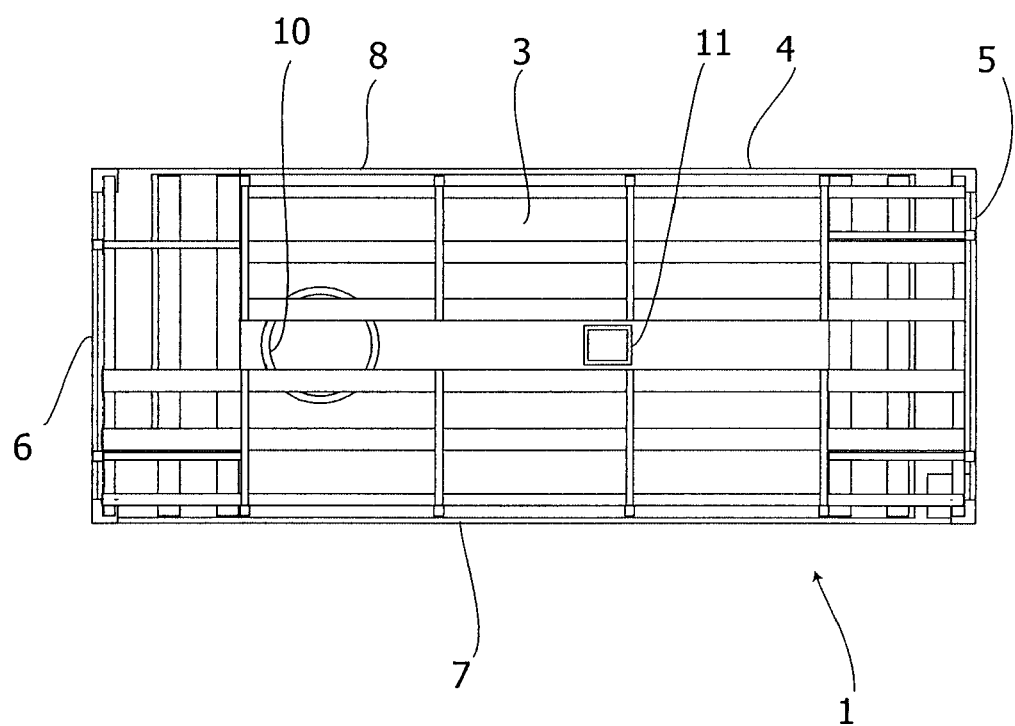
FIG. 2 is a top plan view of the simulator of FIG. 1, with protection fence being lowered.

First, reference is made to FIGS. 1 and 2 which are a perspective view of three quarters from above and a top plan view of the simulator for training in environments confined and/or suspected of pollution according to the present invention. The simulator consists of a container 1 having a base 2 and a roof 3 opposite to the base 2. A protection fence 4, that is collapsible on the roof 3, is shown raised in FIG. 1 and lowered in FIG. 2. The container 1 has perimeter walls that are short, indicated as 5 and 6, and long, indicated as 7 and 8. Provided on the roof 3, which is accessed by a ladder 9, are a vertical manhole 10 and an aspirator/conditioner 11. A horizontal manhole 12 is provided in the long wall 7.

Figure 3:
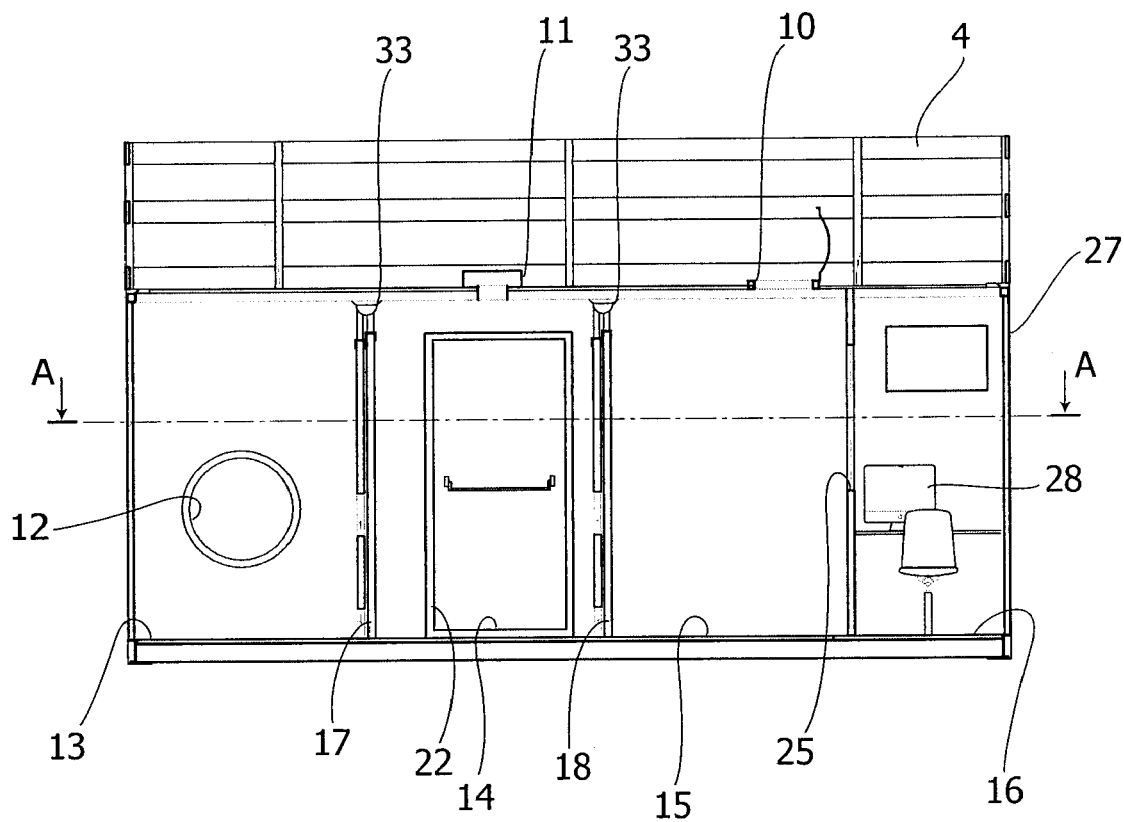
FIG. 3 is a central vertical longitudinal cross-section of the simulator in FIG. 1, that is a cross-section taken along lines B-B in FIG. 4.
Figure 4:
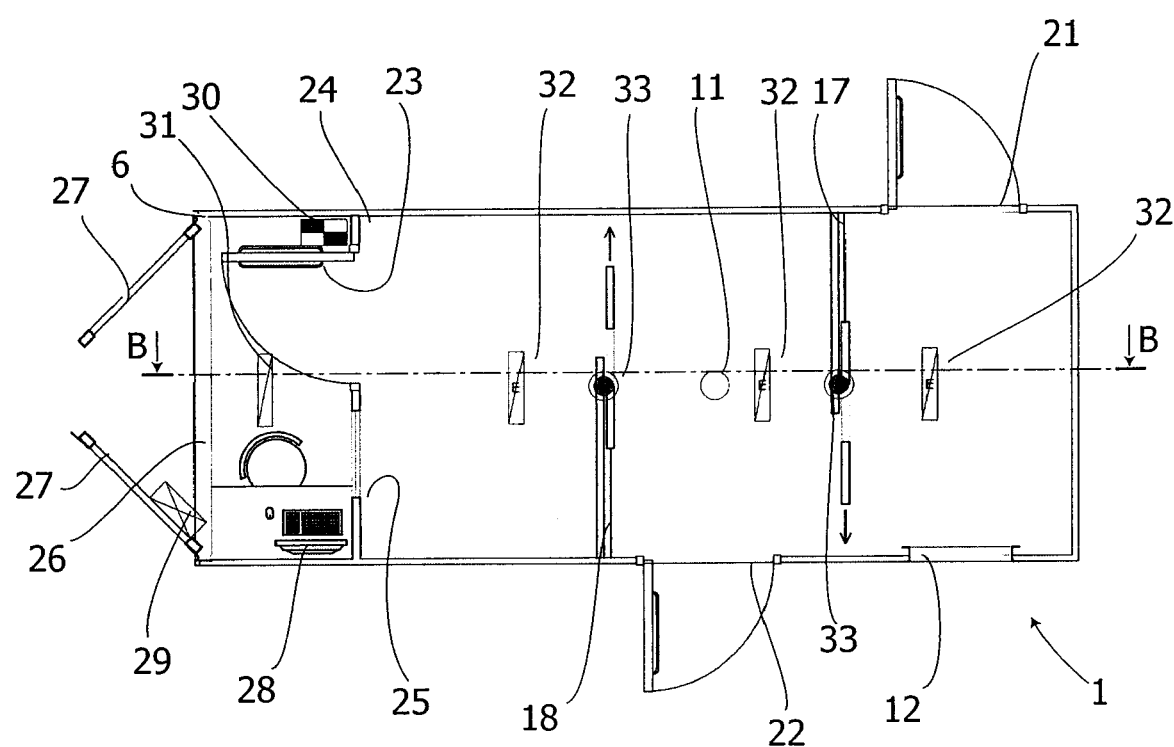
FIG. 4 is a horizontal longitudinal cross-section taken along the line A-A in FIG. 3.

As shown in FIGS. 3 and 4, which are a central vertical longitudinal section of the simulator in FIG. 1, ie a cross-section along the lines B-B in FIG. 4, and a horizontal longitudinal cross-section along the line A-A in FIG. 3, respectively, the two long perimeter walls 7 and 8 delimit a plurality of internal compartments for the training of personnel with equipment that create effects for the training activity. The inner compartments, as they are simply indicated below, are three in number in the present embodiment, and are indicated with 13, 14 and 15. Denoted as 16 is a control, command and management cabin for the training activities used by an operator. The inner compartments 13, 14, 15 are at least partially separated by means of two movable walls 17, 18, arranged transversely with respect to the two long perimetral walls 7 and 8.

Figure 5:
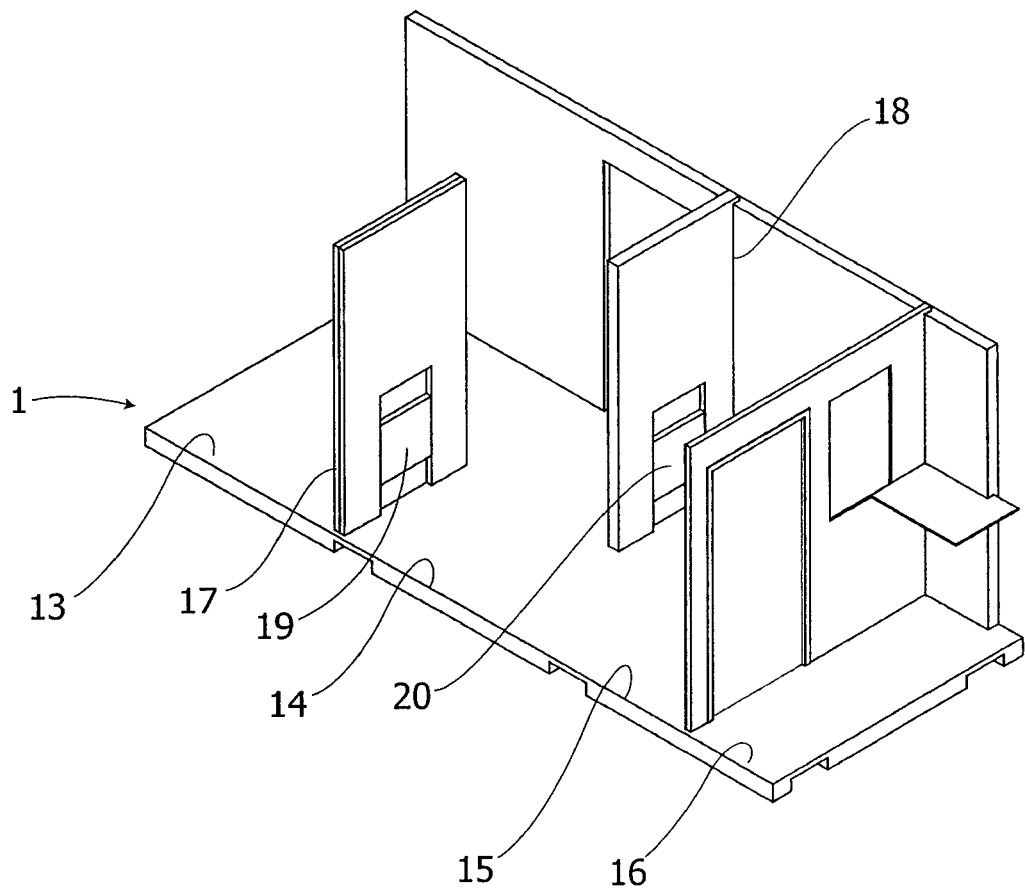
FIG. 5 is a schematic axonometric view of the arrangement of the internal walls of the simulator in FIG. 1.

The movable walls 17, 18 are mutually slidable walls on rails. As better shown in FIG. 5, which is a schematic axonometric view of the arrangement of the inner walls of the container 1, the movable walls 17, 18 have passage openings adjustable through sliding baffles 19, 20.

In this way, it is possible to modify the initial arrangement of the simulator, so creating unforeseen obstacles. Furthermore, the adjustable passage openings of the movable walls 17, 18 require the personnel in training to pass the simulator through a forced passage by crawling on the walking surface or having to climb over the faced part of the wall. It should be understood that the passage condition can be mixed, high or low, or alternating forcing personnel to experience the conditions of fatigue and difficulty in the high/low passage that are typical of confined environments with obstacles due for example to tube bundles or other.

Each of the inner compartments 13, 14, 15 is equipped with a safety output. As shown in FIG. 4, the inner compartment 13 has a safety exit 21, the inner compartment 14 has a safety exit 22, and the inner compartment 15 has a safety exit 23 in a wall 24 which separates the inner compartment 15 from the control, command and management cabin 16 for training activities. In the same wall 24 a window 25 is provided, used by the operator for his activity of control, command and management of the training activities. The cabin 16 communicates with the outside through an opening 26, which is closed with a door 27 and preferably covers the entire short wall 6 of the container 1. Provided in the cabin 16 are a workstation with an electronic computer 28 and control devices of various equipment located in the inner compartments of the container. These devices include an electrical panel 29, a smoke machine 30, an illuminating body 31, lighting bodies 32 with emergency light, the aspirator/air conditioner 11 and thermal imaging cameras 33. Baffle displacement devices, sirens, water leakage devices, lighting bodies for strobe lighting may be present, but not shown in the figures.

The operator in the control, command and management cabin 16 for the training activities can observe from the window 25 the inner compartments for the training and the personnel in training and can act on the equipment which create effects for the training activity. Among other things, the operator can train the personnel on the Lock Out Tag Out procedure, i.e. the restart block, which provides for the reliable deactivation of dangerous energy sources of the machines during maintenance or service operations.

Figure 6:
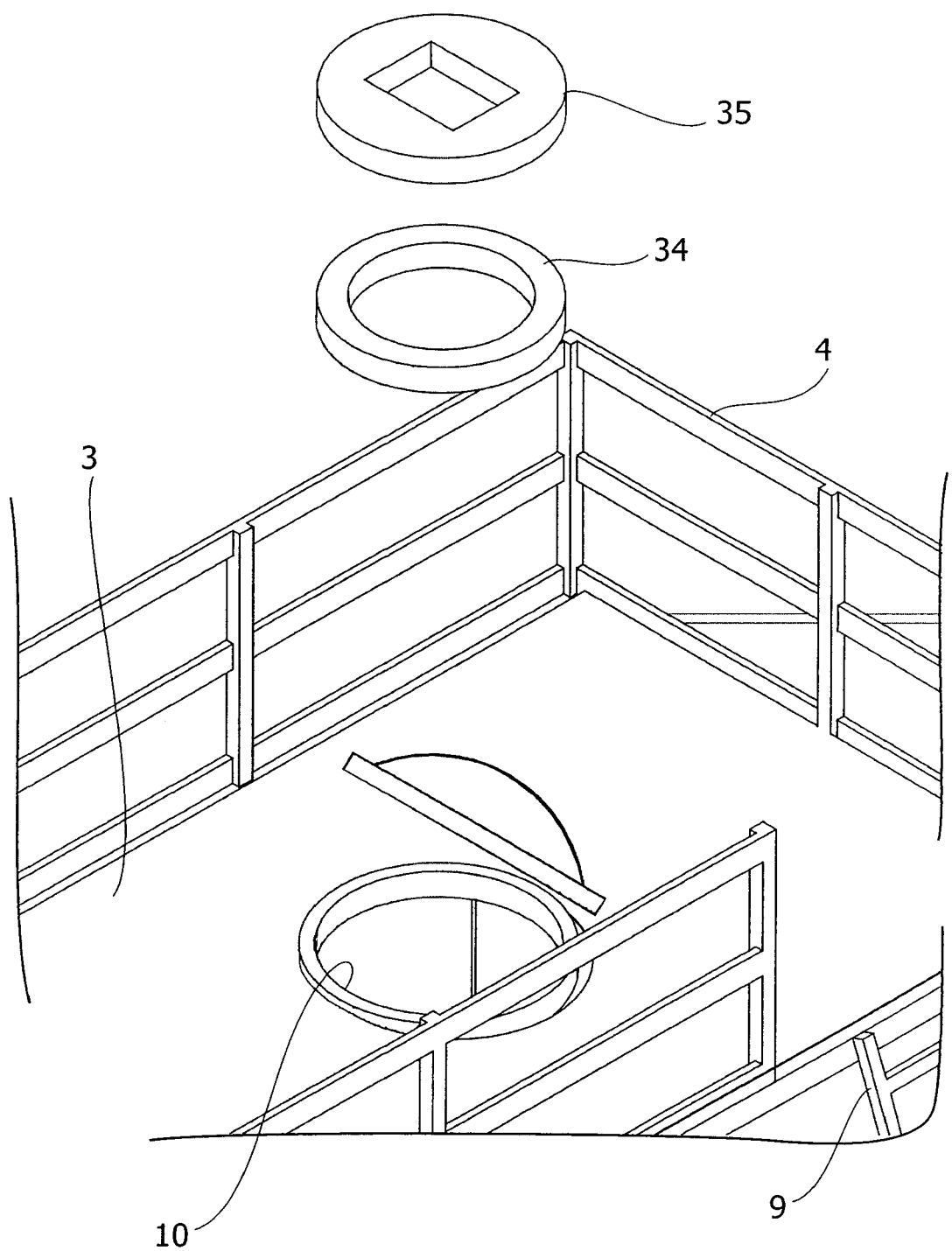
FIG. 6 is a partial perspective view of the simulator in FIG. 1 with a manhole reducer.

Referring to FIG. 6, which is a partial perspective view of the simulator in FIG. 1, it is shown that coaxial shrinking elements can be applied in the vertical manhole 10 to reduce ease of access within the container 1. They are shown, by way of example, a circular opening reduction gear 34 and a square opening reduction gear 35.

In short, the interactive system built inside the container 1 of the simulator according to the present invention, with an adjustable manhole for vertical access and with a manhole for horizontal access, is equipped with movable walls for the alteration of the environment and with equipment to create effects aimed at influencing the sensory and therefore operative capacities of personnel, such as fumes, intermittent lighting, similar to that in a welding activity, noise and microclimate. The simulator is integrated with thermal imaging cameras in order to film the ability of operators in the critical phases of training to maintain a behavior in line with the training received in the classroom. Filming will be recorded and brought to the classroom as case studies to identify limits in procedures and will be used for research to study new safe operating solutions in the recovery of non-collaborating operators in critical situations created in the simulator. The simulator is equipped with integrated lighting and emergency lighting and a power supply system from the ward panel for connection to the 380/220 V power grid. The simulator is equipped with a system to prevent falls from a height and with all accessories necessary for the training phases. The simulator has the advantage of being transportable and, through the possibility of integrated power supply, of being connected in any company requires information, education and training of the personnel.

The container 1 is equipped with eyebolts, which allow the container 1 to be loaded onto a means of transport for sending it to the place of training at the service of companies that require it. The electrical panel installed on the structure of the simulator allows connection to the power grid of the eventual host company, so as to allow all the electrically supplied equipment to work. The simulator is equipped with a winder of about 50 m in order to connect the electrical panel to the electrical panel of the host structure.

The simulator is equipped with structures and systems that allow it to be used safely by all the people working in it, both trainers and personnel to be trained. Access is possible by means of a ladder 9, which can be anchored to the external wall, to access the upper part of the simulator, where an adjustable manhole is arranged. The upper part is protected, from falls from a height, through a retractable metal perimeter parapet that can be closed, when not in use, in order to facilitate the transport of the simulator itself. Among the safety features, two doors with panic exit device on the two opposite sides of the container have already been mentioned. At least one fire extinguisher is also provided. The flooring is resistant to abrasion, reduces noise from foot traffic, is cigarette resistant, is antistatic, reduces the risk of slipping and resists fire. Emergency ceiling lights with indication of the escape routes, warning pictograms, protection with differential switch, and a grounding system with an attached pole and/or cable lugs with a cable of suitable cross-section for connection to the existing ground wire are provided.

The training activity control, command and management cabin with operator in a workstation equipped with a computerized system and a partition panel in darkened glass that is placed to separate the training part, allows the operator to have a direct view in the environment and therefore to condition the same by activating, depending on the case, cameras, smoke, panels displacement, siren, strobe lighting, aspirator/air conditioner, lighting, water leaks and more in order to alter the cognitive skills of the subjects in training and at the same time to check that everything is performing safely.

The vertical manhole is adjustable in size and in the form of the entrance cross-section in order to contemplate all the possible situations that can be found in real working conditions, such as those of a cistern, a well, a sewer drain, a silo, or other. Access through the manhole takes place by means of a cevedale tripod and provides for the harness of the personnel that is lowered inside the container. Everything is recorded from the outside with a camera on a tripod placed on the floor of the simulator at the same level of the manhole. At a pre-entry stage in the simulator, the operator performs a suitability test by checking the air quality inside with multigas detection equipment, equipped with appropriate individual protection devices depending on the environmental simulation to be addressed. If the operator needs a full-face mask, a fit test will be performed through appropriate instrumentation.

The horizontal manhole, arranged on one of the walls of the simulator, allows to simulate one of the most frequent actions, that is, a partial desoldering of the tank or silo or other element, which occurs when the environment is extremely restricted and the operator can get stuck; then, the simulation of a rescue takes place through a horizontal passage with the introduction of a stretcher. Thus, a study of the rescue methods of the injured personnel can be made.

In the container it is possible to install colored pipes and valves to identify the different pipes. These are used to train the personnel for the correct use of the systems and fluids, according to the procedure of the so-called Lock Out Tag Out, which serves to make the working environment safe against contamination or passages of dangerous energies. If this procedure is not followed correctly, a signal is sent to the operator in the cabin that activates the control system to recreate the dangerous situation, but in a controlled and safe manner, for example by injecting smoke or other fluid as a consequence of a personnel error in training. The colors also serve to make the personnel understand the importance of operating the right valves and therefore making the plants work properly. The usual tags can be provided to apply in case of Lock Out Tag Out and to be removed when the exercise is over.

As already mentioned above, the movable walls, arranged inside the container, can slide on rails and allow to modify the initial arrangement of the compartments creating unexpected obstacles. In addition, the walls themselves are equipped with adjustable openings that require personnel to pass through the simulator a forced passage, or crawling on the walking surface or climbing over the faced part of the wall. This serves to accustom personnel to the fact that sometimes the predicted situation is not the one actually encountered during a maintenance or rescue operation.

The wall of the container opposite to that of the control, command and management cabin is removable and dynamic and can simulate a failure of the structure and put the container in communication with other modules. The same modules can be combined with a pipe that can be connected to the horizontal manhole of the simulator.

What claimed is:

1. A simulator for training in environments confined and/or suspected of pollution, the simulator comprising:
   a container that has a base having a walking surface, a roof opposite to the base, and a perimeter wall comprised of two short perimeter walls and two long perimeter walls;
   at least one vertical manhole located on the roof;
   a horizontal manhole located on the perimeter wall;
   two safety exits that lead outwards of the container,
   the two long perimeter walls delimiting a plurality of internal compartments for personnel training,
   the internal compartments being provided with equipment that produces effects in training activities, and at least one training activity control, command and management cabin for use by an operator;
   movable partitions arranged transversely to the two long perimeter walls, the internal compartments for personnel training being at least partially separated by the movable partitions arranged transversely to the two long perimeter walls;
   passage openings located in the movable partitions; and
   sliding baffles arranged in respective ones of the passage openings of said movable partitions,
   wherein the passage openings are adjustable by sliding the sliding baffles within the respective ones of the passage openings to modify an initial arrangement of the simulator so that a passage condition of each respective one of the passage openings can be mixed to include i) a high passage opening with the sliding baffles in a lowered position within the respective ones of the passage openings that forces personnel using the simulator to climb over the sliding baffles and ii) a low passage opening with the sliding baffles in a raised position within the respective ones of the passage openings that forces the personnel to crawl on the walking surface, thereby forcing the personnel to experience conditions of fatigue and difficulty in passing through the high passage opening and the low passage opening.

2. The simulator according to claim 1, wherein said movable partitions are partitions mutually sliding on rails.

3. The simulator according to claim 1, wherein each of said internal compartments for personnel training is equipped with a safety exit, at least one of which goes out to the training activity control, command and management cabin.

4. The simulator according to claim 1, wherein the training activity control, command and management cabin has a door that swings outwards on one of the two short perimeter walls of the container.

5. The simulator according to claim 4, wherein the training activity control, command and management cabin has, on a side opposite to the door that swings outwards, a window for training observation in the internal compartments, a workstation provided with a computer and a control panel usable by the operator to act on the equipment that produces effects in the training activity.

6. The simulator according to claim 5, wherein the workstation is configured to be operable by the operator to train the personnel on the safety procedure of Lock Out Tag Out, which provides for reliable deactivation of hazardous energy sources during maintenance or support operations.

7. The simulator according to claim 1, wherein the roof is enclosed by a collapsible fence.

8. The simulator according to claim 1, wherein the at least one vertical manhole has reducing concentric elements applicable to reduce ease of access.

9. The simulator according to claim 1, further comprising inside the container are equipment selected from the group consisting of an electrical panel, a smoke machine, a lighting body for stroboscopic illumination, a lighting body with emergency light, an air conditioner, an infrared camera, a baffle displacement device, sirens, and water emitting devices.

10. A simulator for training in environments confined and/or suspected of pollution, the simulator comprising:
    a container that has a base having a walking surface, a roof opposite to the base, and a perimeter wall;
    a manhole located on each of the roof and the perimeter wall;
    a safety exit that leads outwards of the container,
    the perimeter wall delimiting a plurality of internal compartments for personnel training,
    the internal compartments being provided with equipment that produces effects in training activities, and a training activity control, command and management cabin for use by an operator;
    movable partitions arranged transversely to the perimeter wall, the internal compartments being at least partially separated by the movable partitions;
    passage openings located in the movable partitions; and
    sliding baffles arranged in the passage openings of said movable partitions,
    wherein the passage openings are adjustable by sliding the sliding baffles within respective ones of the passage openings so that a passage condition of each respective one of the passage openings can be mixed to include
    i) a high passage opening with the sliding baffles in a lowered position within the respective ones of the passage openings and
    ii) a low passage opening with the sliding baffles in a raised position within the respective ones of the passage openings,
    the passage openings being adjusted by sliding the sliding baffles thereby forcing the personnel to experience different conditions in passing through the high passage opening and the low passage opening.

11. The simulator according to claim 10, wherein said movable partitions are partitions mutually sliding on rails.

12. The simulator according to claim 11, further comprising, inside the container, plural equipment selected from the group consisting of an electrical panel, a smoke machine, a lighting body for stroboscopic illumination, a lighting body with emergency light, an infrared camera, a baffle displacement device, sirens, and water emitting devices.

13. The simulator according to claim 10, wherein the manhole located on the roof has reducing concentric elements applicable to reduce ease of access.

14. The simulator according to claim 13, further comprising, inside the container, plural equipment selected from the group consisting of an electrical panel, a smoke machine, a lighting body for stroboscopic illumination, a lighting body with emergency light, an infrared camera, a baffle displacement device, sirens, and water emitting devices.

15. The simulator according to claim 10, further comprising, inside the container, plural equipment selected from the group consisting of an electrical panel, a smoke machine, a lighting body for stroboscopic illumination, a lighting body with emergency light, an infrared camera, a baffle displacement device, sirens, and water emitting devices.

16. The simulator according to claim 10, wherein the roof is enclosed by a collapsible fence.

* * * * *